US011159725B2

(12) United States Patent
Kawano et al.

(10) Patent No.: US 11,159,725 B2
(45) Date of Patent: Oct. 26, 2021

(54) IMAGE PROCESSING APPARATUS, IMAGE PROCESSING METHOD, AND RECORDING MEDIUM

(71) Applicants: MORPHO, INC., Tokyo (JP); Sharp Corporation, Osaka (JP)

(72) Inventors: Hirotaka Kawano, Tokyo (JP); Shun Hirai, Tokyo (JP); Masaki Satoh, Tokyo (JP); Michihiro Kobayashi, Tokyo (JP); Taiga Koseki, Tokyo (JP)

(73) Assignees: MORPHO, INC., Tokyo (JP); Sharp Corporation, Osaka (JP)

( * ) Notice: Subject to any disclaimer, the term of this patent is extended or adjusted under 35 U.S.C. 154(b) by 0 days.

(21) Appl. No.: 16/866,567

(22) Filed: May 5, 2020

(65) Prior Publication Data

US 2020/0358955 A1    Nov. 12, 2020

(30) Foreign Application Priority Data

May 7, 2019    (JP) .............................. JP2019-087663

(51) Int. Cl.
*H04N 5/232* (2006.01)
*H04N 5/235* (2006.01)
(Continued)

(52) U.S. Cl.
CPC ..... *H04N 5/23277* (2013.01); *H04N 5/23258* (2013.01)

(58) Field of Classification Search
CPC ........... H04N 5/23277; H04N 5/23258; H04N 5/23254; H04N 5/2353; H04N 5/2352;
(Continued)

(56) References Cited

U.S. PATENT DOCUMENTS 9,986,163 B2 *  5/2018 Park ..................... H04N 5/2327
2010/0209009 A1 *  8/2010 Matsunaga ........ H04N 9/04515
348/208.99
(Continued)

FOREIGN PATENT DOCUMENTS

CN   101895679   11/2010
CN   102833471   12/2012
(Continued)

OTHER PUBLICATIONS

"Office Action of China Counterpart Application", dated May 24, 2021, with English translation thereof, p. 1-p. 17.

*Primary Examiner* — Marly S Camargo
(74) *Attorney, Agent, or Firm* — JCIPRNET

(57) ABSTRACT

An image processing apparatus includes: an alignment unit configured to perform alignment for a group of images including a plurality of short-time-exposure images that are captured with a first exposure time and a long-time-exposure image that is captured with a second exposure time that is longer than the first exposure time; and an output unit configured to output the long-time-exposure image in a case where the long-time-exposure image satisfies a predetermined condition and configured to output a composite image which is generated by compositing a plurality of images selected from among the plurality of short-time-exposure images, in a case where the long-time-exposure image does not satisfy the predetermined condition.

12 Claims, 9 Drawing Sheets

(51) Int. Cl.
*H04N 5/355* (2011.01)
*H04N 7/01* (2006.01)
*G06T 5/00* (2006.01)
*G06T 7/20* (2017.01)
*G06F 16/78* (2019.01)

(58) Field of Classification Search
CPC ...... H04N 5/243; H04N 5/2355; H04N 5/355; H04N 5/35536; H04N 5/2329; H04N 7/014; H04N 7/0157; H04N 19/139; G06T 5/003; G06T 2207/10144; G06F 16/786
USPC ............ 348/154, 155, 208.1, 208.2, 208.99, 348/208.4, 208.6, 208.12, 208.13, 221.1, 348/362, 229.1, 222.1, 402.1, 413.1, 699; 382/151, 184, 224, 294, 274, 172, 270, 382/254, 263, 253, 103, 107, 236; 375/240.16, 240.11, 240.22
See application file for complete search history.

(56) References Cited

U.S. PATENT DOCUMENTS

| | | | | |
|---|---|---|---|---|
| 2010/0246989 | A1* | 9/2010 | Agrawal | G06K 9/40 382/255 |
| 2011/0069205 | A1* | 3/2011 | Kasai | H04N 5/262 348/239 |
| 2012/0038793 | A1* | 2/2012 | Shimizu | H04N 5/228 348/232 |
| 2012/0218442 | A1* | 8/2012 | Jandhyala | H04N 5/262 348/239 |
| 2013/0051700 | A1* | 2/2013 | Jo | G06T 5/003 382/284 |
| 2014/0198226 | A1* | 7/2014 | Lee' | H04N 5/2355 348/208.1 |
| 2014/0313369 | A1* | 10/2014 | Kageyama | H04N 9/73 348/239 |
| 2015/0296116 | A1* | 10/2015 | Tsuzuki | H04N 5/2355 348/208.1 |
| 2018/0035057 | A1* | 2/2018 | Thumpudi | H04N 5/265 |
| 2020/0106945 | A1* | 4/2020 | Hsieh | H04N 5/2356 |

FOREIGN PATENT DOCUMENTS

| | | |
|---|---|---|
| CN | 103095984 | 5/2013 |
| CN | 105556957 | 5/2016 |
| CN | 105681626 | 6/2016 |
| CN | 105827964 | 8/2016 |
| CN | 106331514 | 1/2017 |
| JP | 2011244144 | 12/2011 |
| JP | 2014154982 | 8/2014 |

* cited by examiner

IMAGE PROCESSING APPARATUS, IMAGE PROCESSING METHOD, AND RECORDING MEDIUM

CROSS-REFERENCE TO RELATED APPLICATION

This application claims the priority benefit of Japan Application No. 2019-087663, filed on May 7, 2019. The entirety of the above-mentioned patent application is hereby incorporated by reference herein and made a part of this specification.

BACKGROUND

Field

The present invention relates to an image processing technique for generating an image in which a subject blur is suppressed.

Description of Related Art

In a case where the motion of a subject is faster than a shutter speed, a subject blur may occur in an output image. For this reason, an image capturing technique for suppressing the occurrence of a subject blur and an image processing technique for generating an image with a suppressed subject blur have been proposed.

For example, the image capturing device disclosed in Japanese Patent Laid-Open No. 2011-244144 (Patent Literature 1) utilizes motion vector information of an encoder that encodes moving image data, so as to calculate an exposure time by which a subject blur can be suppressed, and controls a shutter speed for capturing a moving image.

SUMMARY

Theoretically, in the image capturing device disclosed in Patent Literature 1, the longest exposure time (that is, the slowest shutter speed) is calculated from among the exposure times, as an appropriate exposure time by which a subject blur can be suppressed. However, in practice, there is a possibility that a high-quality image without occurrence of a subject blur can be obtained by capturing the image with an exposure time that is longer than the above-described appropriate exposure time. Note that a subject blur refers to a blur of a subject, which is caused by the motion of the subject being faster than the shutter speed.

Moreover, in the image capturing device disclosed in Patent Literature 1, in a case where an exposure time that is shorter than a truly appropriate exposure time is set as an appropriate exposure time, a high sensitivity needs to be set for image-capturing so as to compensate the shortage of light amount. Therefore, noise may occur in a captured image because of the high sensitivity for image-capturing.

The present invention is made in view of such problems as described above, and an object of the present invention is to provide an image processing technique for generating a high-quality image.

According to an aspect of the present invention, an image processing apparatus includes: an alignment unit configured to perform alignment for a group of images including a plurality of short-time-exposure images that are captured with a first exposure time and a long-time-exposure image that is captured with a second exposure time that is longer than the first exposure time; and an output unit configured to output the long-time-exposure image in a case where the long-time-exposure image satisfies a predetermined condition and configured to output a composite image which is generated by compositing a plurality of images selected from among the plurality of short-time-exposure images, in a case where the long-time-exposure image does not satisfy the predetermined condition.

According to the image processing technique of the present invention, a subject blur is suppressed, and an image having a small amount of noise is generated. As a result, there is an effect that a high-quality image can be generated.

DETAILED DESCRIPTION

Hereinafter, an explanation is given of an example of embodiments of the present invention with reference to the drawings. Note that, in the explanation of the drawings, the same elements may be denoted with the same reference signs, so as to omit duplicated explanations. The constituent elements described in the present embodiment are merely examples, and it is not intended that the scope of the present invention is limited as such.

Embodiment

Hereinafter, an explanation is given of an example of embodiments for realizing the image processing technique of the present invention.

Figure 1:
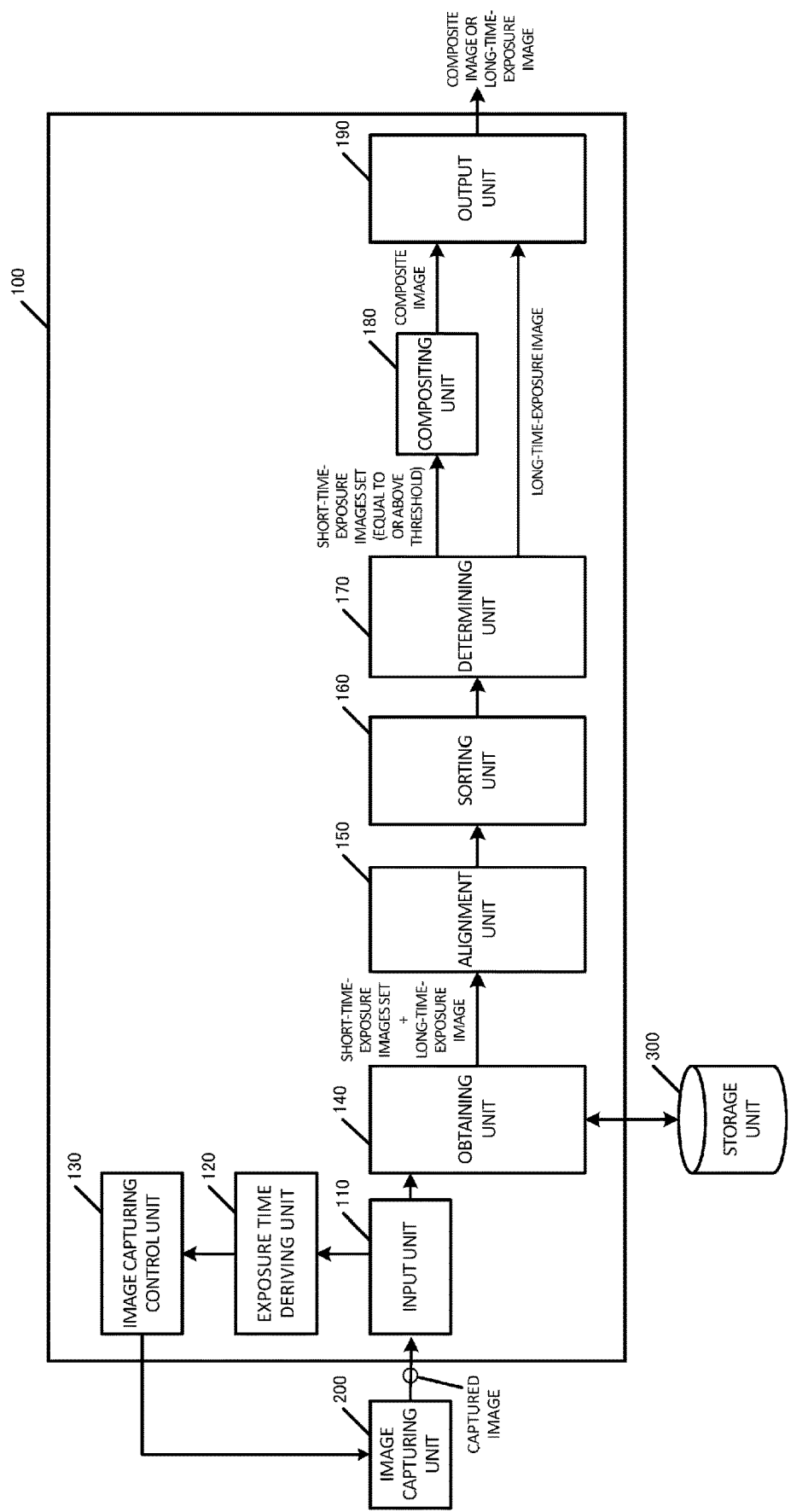
FIG. 1 is a block diagram illustrating an example of the functional configuration of an image processing apparatus.

FIG. 1 is a block diagram illustrating an example of the functional configuration of an image processing apparatus 100 according to one aspect of the present embodiment. The image processing apparatus 100 includes, for example, an input unit 110, an exposure time deriving unit 120, an image capturing control unit 130, an obtaining unit 140, an alignment unit 150, a sorting unit 160, a determining unit 170, a compositing unit 180, and an output unit 190. For example, these units are functional parts (functional blocks) included in a processing unit (processing device), a control unit (control device), or the like (not illustrated in the drawings), of the image processing apparatus 100, and these units are configured by including a processor such as a CPU or a DSP, an integrated circuit such as an ASIC, or the like.

For example, the input unit 110 has a function of receiving input of an image captured through an image capturing unit 200 outside the image processing apparatus 100 (hereinafter such an image is referred to as a "captured image").

The exposure time deriving unit 120 has a function of, for example, deriving (calculating), based on a captured image input to the input unit 110, an exposure time corresponding to the captured image.

The image capturing control unit 130 is a functional unit for controlling the image capturing unit 200 or controlling the image-capturing of the image capturing unit 200. For example, the image capturing control unit 130 has a function of setting an exposure time of the image capturing unit 200. Furthermore, for example, the image capturing control unit 130 has a function of setting an ISO sensitivity corresponding to the exposure time derived by the exposure time deriving unit 120.

The obtaining unit 140 has a function of, for example, obtaining a short-time-exposure images set and a long-time-exposure image, among images which have been input to the input unit 110. Details will be described later.

The alignment unit 150 has a function of, for example, performing alignment for a group of images including the short-time-exposure images set and the long-time-exposure image.

The sorting unit 160 has a function of, for example, sorting the short-time-exposure images set and the long-time-exposure image, for which alignment has been performed by the alignment unit 150, according to a predetermined criterion.

The determining unit 170 has a function of, for example, determining whether or not the long-time-exposure image is ranked (prioritized) at a position equal to or above a threshold among the group of images sorted by the sorting unit 160.

The compositing unit 180 has a function of, for example, compositing a group of images (a part of the short-time-exposure images set) which are selected based on sharpness threshold, into one image.

The output unit 190 has a function of, for example, outputting an image which has resulted from the compositing by the compositing unit 180.

Here, the concept of "output" of an image includes displaying of an image on its own device (display output), outputting of an image to another functional unit of its own device (internal data output), outputting or transmitting of an image to a device (external data output) other than its own device (external data transmission), and the like.

(Procedure of Image Processing)

Figure 2:
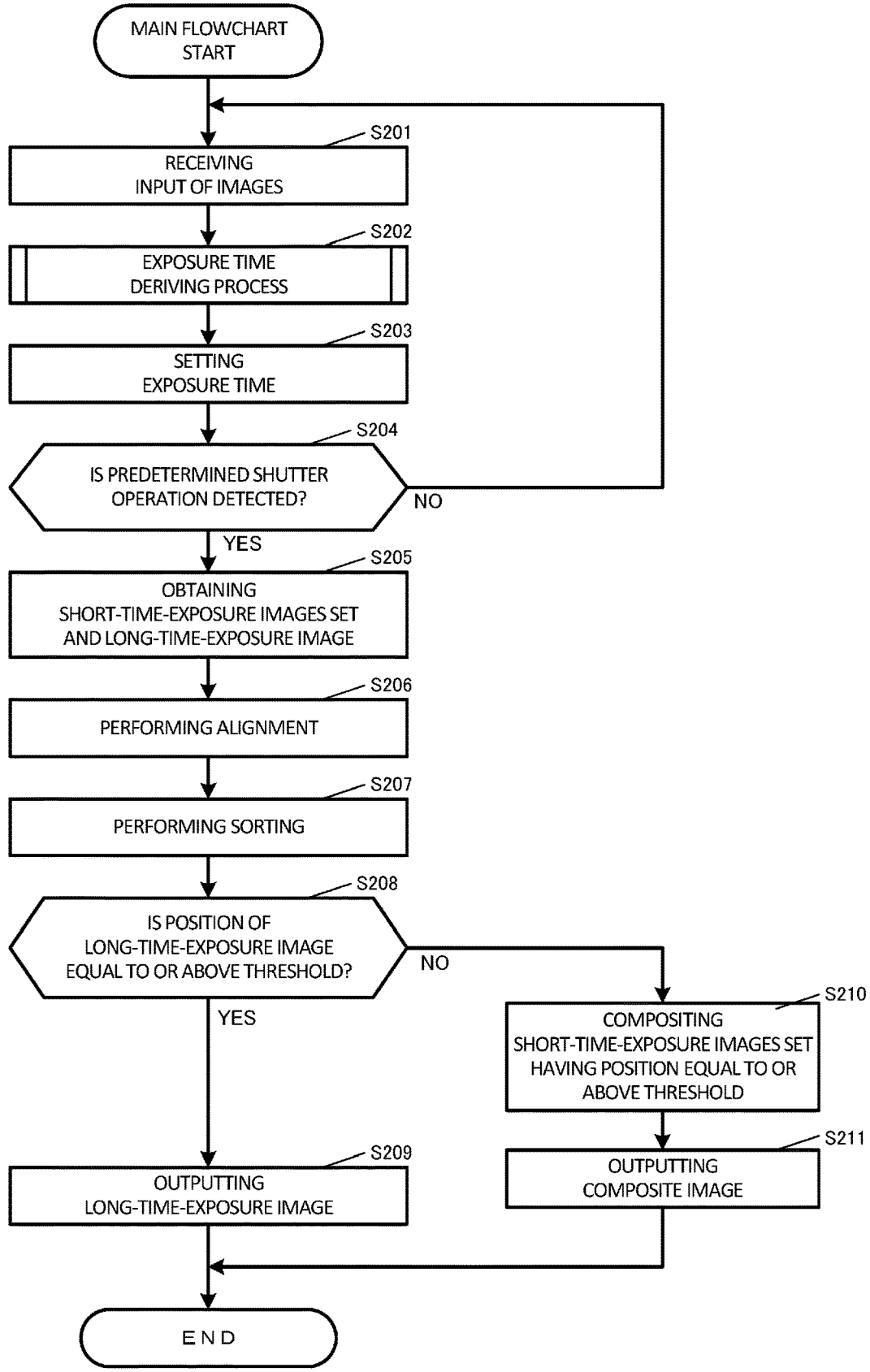
FIG. 2 is a flowchart illustrating an example of a flow of image processing.

FIG. 2 is a flowchart illustrating one example of the procedure of the image processing according to the present embodiment.

For example, a processing unit (not illustrated in the drawings) of the image processing apparatus 100 reads out the code of an image processing program stored in the storage unit 300 into a RAM (not illustrated in the drawings) and executes the code, so as to realize the processing of the flowchart of FIG. 2.

Note that, although the storage unit 300 is excluded from the elements of the image processing apparatus 100 in FIG. 1, the storage unit 300 may be included as a constituent element of the image processing apparatus 100. Furthermore, each symbol "S" in the flowchart of FIG. 2 means a step.

Additionally, the flowchart explained below is merely an example of the procedure of the image processing according to the present embodiment, and, though needless to say, other step(s) may be added or part of the steps may be deleted.

In S201, the input unit 110 receives input of captured images which have been captured through the image capturing unit 200. Note that, for example, the input captured images may be displayed on a display unit (not illustrated in the drawings).

In S202, the exposure time deriving unit 120 performs an exposure time deriving process for deriving an exposure time for the image capturing unit 200.

Figure 3:
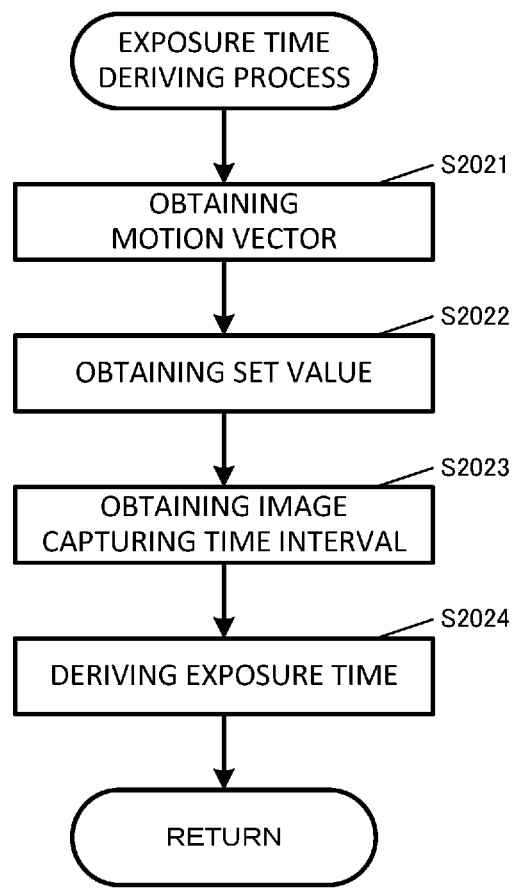
FIG. 3 is a flowchart illustrating an example of a flow of deriving an exposure time.

FIG. 3 is a flowchart for explaining an example of the procedure of the exposure time deriving process. The processes of S2021 through S2024 are executed by the exposure time deriving unit 120.

In S2021, the exposure time deriving unit 120 obtains a motion vector from the captured images.

Here, a "motion vector" is a vector indicating the direction and the magnitude of a motion of a region moving between the captured images. For example, in the present embodiment, a motion vector is obtained from two captured images that are continuous in a time series order, by use of a publicly known method, such as block matching.

Figure 4:
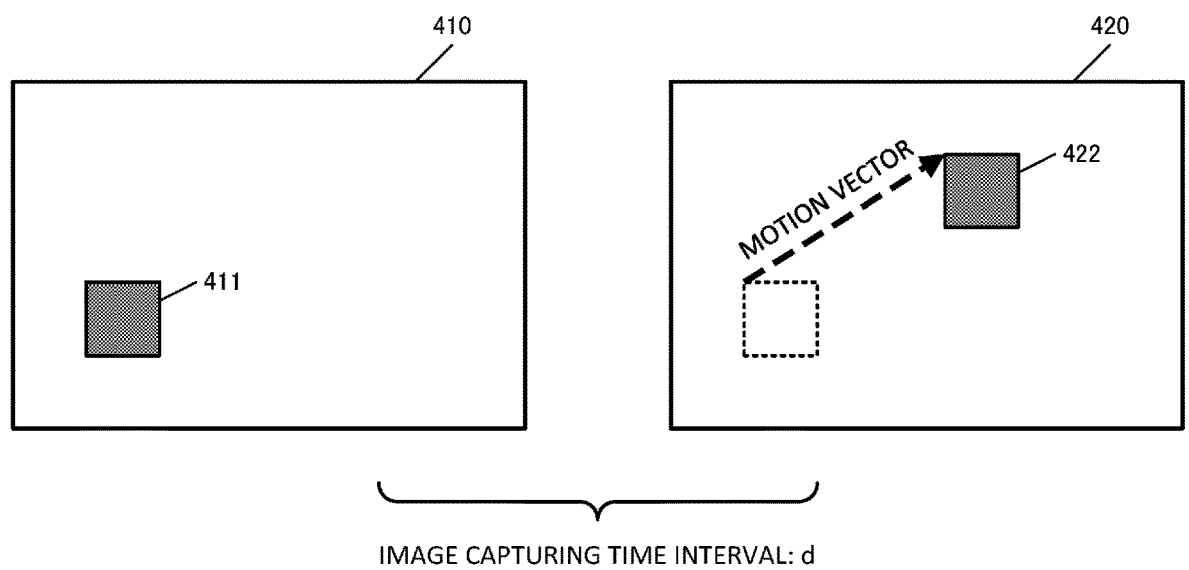
FIG. 4 is a diagram illustrating how an exposure time is derived based on a motion vector.

FIG. 4 is a diagram for explaining a principle of deriving an exposure time based on an obtained motion vector.

In FIG. 4, the captured image 410 and the captured image 420 respectively indicate a captured image captured earlier and a captured image captured later, in the time series order.

Here, it is assumed that the macroblock 411 in the captured image 410 and the macroblock 422 in the captured image 420 include an identical subject. In this case, the exposure time deriving unit 120 derives a shift amount from the position of the macroblock 411 to the position of the macroblock 422 as a motion vector of the macroblock 422. In FIG. 4, the position of the macroblock 411 is indicated by a broken-line rectangle, and the motion vector of the macroblock 422 is indicated by a broken-line arrow.

Returning to FIG. 3, in S2022, a set value is obtained. The set value obtained in S2022 is a value indicating an allowable amount of spatial distance (the number of pixels in the present embodiment) between corresponding pixels in at least two captured images. The smaller the set value is, the shorter the allowable distance between the pixels becomes, and, the greater the set value is, the longer the allowable distance between the pixels becomes. That is, it can be said that the set value is an index (index value) indicating an allowable magnitude of subject blur. For example, the exposure time deriving unit 120 obtains a set value that is preliminarily stored in the storage unit 300.

Note that other than the set value may be preliminarily stored in the storage unit 300, alternatively, for example, a value that is input by a user via an operation unit (not illustrated in the drawings) may also be used as the set value. Furthermore, for example, a value that is received by a communication unit (not illustrated in the drawings) from an external device such as a server through a client-server system, etc., may be used as the set value. Alternatively, the set value may be downloaded by a communication unit through the Internet, etc., to be used.

In S2023, an image capturing time interval is obtained. For example, the image capturing time interval obtained in S2023 may be a time interval between which two captured images are captured. Specifically, for example, in a case where captured images are frames included in a live view moving image, the image capturing time interval is a frame interval corresponding to the frame rate of the live view.

Note that, instead of such an image capturing time interval as described above, an image capturing period which is a period defined by an image capturing time interval, may be obtained for performing the processes thereafter.

In S2024, an exposure time is derived. In the present embodiment, based on the image capturing time interval obtained in S2023, an exposure time for suppressing the spatial distance between corresponding pixels in the two captured images within the set value (or lower than the set value) is derived.

Here, for example, the derived exposure time "t" is expressed by the following equation (1) where the vector amount (the vector magnitude, the vector value) of the motion vector is "m", the set value is "x", and the image capturing time interval is "d".

$$t=d\times x/m \quad (1)$$

For example, assuming the case that the two captured images illustrated in FIG. 4 are two frames included in a live view moving image of 30 fps. In a case where the vector amount of the obtained motion vector is "17.24" and the set value is "5", the result of the calculation by the equation (1) is as follows.

$$t=33 \text{ [ms]}\times 5/17.24=9.57 \text{ [ms]}$$

Therefore, the exposure time deriving unit 120 derives "9.57 ms" as the exposure time. Upon completion of S2024, the exposure time deriving process ends, and the processing returns to the main flowchart.

Returning to the main flowchart of FIG. 2 after the exposure time deriving process is performed, the image capturing control unit 130 sets an exposure time of the image capturing unit 200 in S203. In the present embodiment, the image capturing control unit 130 sets an exposure time for capturing a short-time-exposure images (hereinafter referred to as the "first exposure time") and an exposure time for capturing a long-time-exposure image (hereinafter referred to as the "second exposure time").

It can be said that, theoretically, the exposure time derived in S202 is the longest exposure time being possible for suppressing a subject blur within the set value. In the present embodiment, as an example, the exposure time derived in S202 is set as the first exposure time. On the other hand, an exposure time longer than the first exposure time is set as the second exposure time. For example, an exposure time which is 2.0 times longer than the first exposure time is set as the second exposure time.

Note that a ratio for setting the second exposure time with respect to the first exposure time can be arbitrarily set. Furthermore, the above-described ratio may be changed according to an image-capturing environment such as brightness, darkness and the like.

Moreover, the image capturing control unit 130 sets an ISO sensitivity corresponding to the derived exposure time. Specifically, for example, the image capturing control unit 130 sets an ISO sensitivity based on the method below. The ISO sensitivity can be set using a numerical value, a level, or the like. Then, the set ISO sensitivity is output to the image capturing unit 200 so as to make the image capturing unit 200 capture an image according to the ISO sensitivity.

Figure 5:
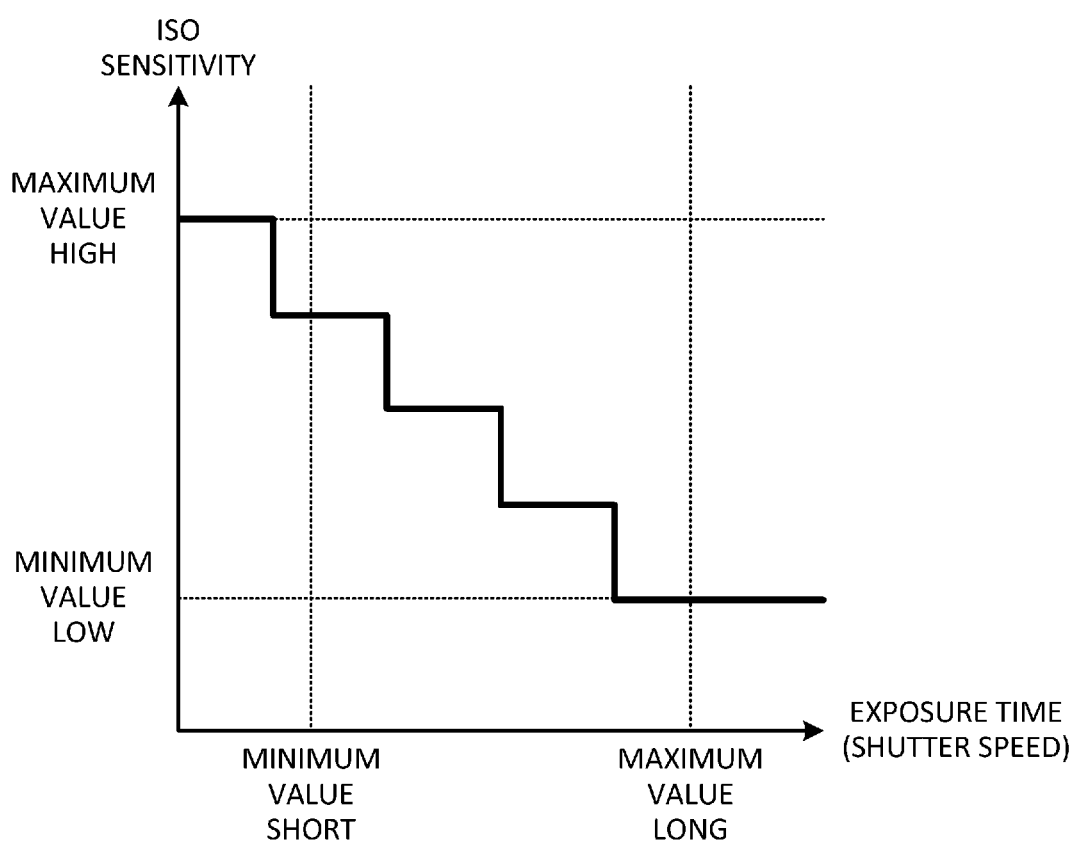
FIG. 5 is an example of a graph illustrating a relationship between exposure time and ISO sensitivity.

FIG. 5 is an example of a graph illustrating a correspondence relationship between an exposure time and an ISO sensitivity. In this graph, the horizontal axis indicates an exposure time, and the vertical axis indicates an ISO sensitivity. An ISO sensitivity is an index value (photosensitivity) indicating how low light can be for being recorded on a given film. Additionally, considering the relationship between exposure time and shutter speed, "SHUTTER SPEED" is written in parentheses together with "EXPOSURE TIME" on the horizontal axis.

For example, based on the above-described correspondence relationship between an exposure time and an ISO sensitivity, the image capturing control unit 130 sets an ISO sensitivity corresponding to a range to which the exposure time derived by the exposure time deriving unit 120 belongs. For example, the correspondence relationship between an exposure time and an ISO sensitivity can be preliminarily stored in the storage unit 300 as an ISO sensitivity table, as described later in the practical example.

In S204, the processing unit determines whether a predetermined shutter operation is detected or not. For example, this predetermined shutter operation may be a shutter operation for continuous shooting (for example, burst shooting). Additionally, for example, the shutter operation for continuous shooting may be a long-press operation on a shutter button (not illustrated in the drawings). In a case where the predetermined shutter operation is not detected (S204: NO), the processing of S201 through S203 is repeated. Contrarily, in a case where the predetermined shutter operation is detected (S204: YES), the processing proceeds to S205.

In S205, the obtaining unit 140 obtains a set of short-time-exposure images and a long-time-exposure image that have been captured through the image capturing unit 200. For example, the short-time-exposure images set are a plurality of short-time-exposure images (a set of a plurality of short-time-exposure images) captured with the first exposure time in continuous shooting (for example, burst shooting), which is triggered by the predetermined shutter operation of S204. Furthermore, a long-time-exposure image captured with the second exposure time is also obtained in S205, which is triggered by the predetermined shutter operation of S204, for example. In other words, it can be said that bracket shooting, in which multiple images are captured with different exposure times, is performed by a trigger of the predetermined shutter operation of S204.

In S206, the alignment unit 150 performs alignment for a group of images including the short-time-exposure images set and the long-time-exposure image. For example, in a case where an image is captured by a smartphone held by user's hand, it is highly possible that a positional shift of pixels occurs between images.

Therefore, alignment is performed for the obtained short-time-exposure images set and long-time-exposure image. For example, the alignment unit 150 may perform a publicly known alignment process using optical flow. This method includes a method such as a block matching method, a gradient method or the like. Alternatively, it is also possible that a sensor output value from an inertial sensor such as a gyro sensor is obtained for each captured image, and thereby alignment is performed according to the shift amount between images.

In S207, based on a predetermined criterion, the sorting unit 160 sorts the short-time-exposure images set and the long-time-exposure image, for which alignment has been performed in S206. In the present embodiment, the group of images are rearranged in descending order from an image having the highest sharpness. "Sharpness" is a type of index (index value) indicating the clarity of an image.

For example, two types of Gaussian filters having different intensities may be applied to an image, and the squared values of differences (SSD) between the two images obtained by the blurring process can be used for the sharpness of the image.

Furthermore, the sorting unit 160 may perform the sorting in consideration of another criterion in addition to sharpness. For example, a score according to the sharpness and a score according to the size of a superimposed region which is common to other image(s) may be given to each image, and thereby the images are rearranged in descending order based on the total scores. By taking the size of a superimposed region into account, image(s) suitable for the compositing in the compositing process (S210), which will be described later, can be highly ranked.

In S208, the determining unit 170 determines whether the long-time-exposure image is, among the group of images sorted in S207, ranked at a position equal to or above a threshold. Specifically, for example, in a case where sorting for the group of images has been performed based on an order of sharpness, it is possible to use a threshold corresponding to a predetermined degree of sharpness (threshold sharpness). In this case, for example, the determining unit 170 classifies the group of images into a group of images having sharpness equal to or higher than the threshold and a group of images having sharpness lower than the threshold. Then, in a case where the determining unit 170 determines that the long-time-exposure image is included in the group of images having sharpness equal to or higher than the threshold (S208: YES), the images other than the long-time-exposure image are deleted from the storage unit 300.

Note that it is also possible that, in S208, the determining unit 170 classifies the group of images into a group of images having sharpness higher than the threshold and a group of images having sharpness equal to or lower than the threshold. In this case, when the long-time-exposure image is included in the group of images having sharpness higher than the threshold, the images other than the long-time-exposure image are deleted from the storage unit 300.

Then, the output unit 190 outputs the long-time-exposure image in S209, and the processing of the present flowchart ends.

As described above, it can be said that, theoretically, the first exposure time is the longest exposure time being possible for suppressing a subject blur within the set value. However, although an image is captured with the second exposure time, a subject blur does not always occur in the long-time-exposure image.

Therefore, the image processing apparatus 100 of the present embodiment obtains a short-time-exposure images set and a long-time-exposure image in one continuous shooting (for example, burst shooting). Further, in a case where the long-time-exposure image is ranked at a position equal to or above a predetermined threshold, it is estimated that a subject blur is not occurring and the image processing apparatus 100 outputs the long-time-exposure image.

Figure 6:
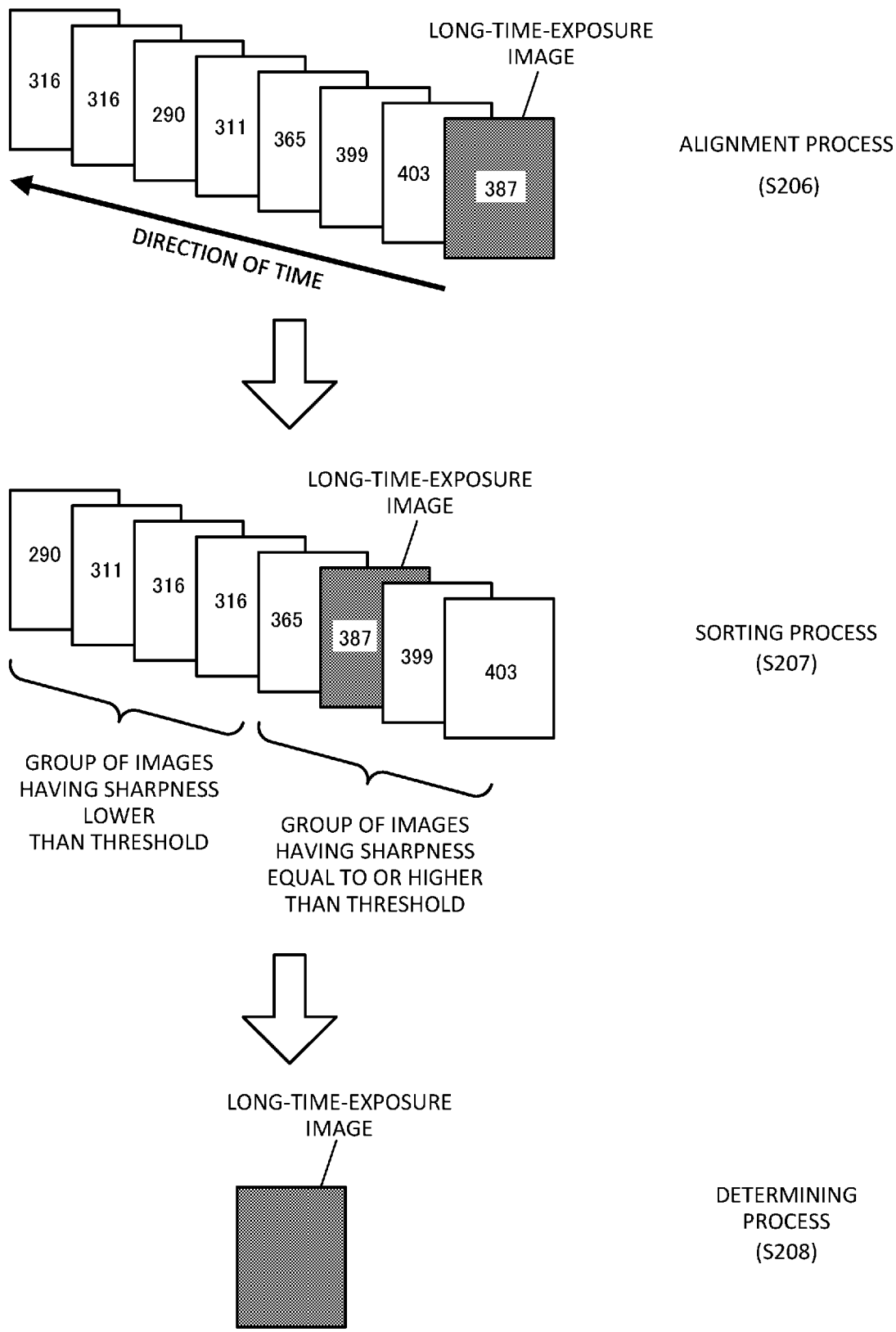
FIG. 6 is a diagram illustrating a specific example of outputting a long-time-exposure image.

FIG. 6 is a diagram illustrating a specific example in which a long-time-exposure image is output in the present embodiment. In FIG. 6, a situation in which alignment (S206) is performed for one long-time-exposure image and seven short-time-exposure images is illustrated. Each of the rectangles represents an image, and the number in each rectangle means the sharpness of the image.

In a case where sorting in the order based on sharpness is performed on the group of images in the example of FIG. 6, the long-time-exposure image is ranked at the third of the eight total images. For example, in a case where the threshold for sharpness is "350", the four images having sharpness of "403", "399", "387", and "365", respectively, are included in the group of images having sharpness equal to or higher than the threshold, and the four images having sharpness of "316", "316", "311", and "290", respectively, are included in the group of images having sharpness lower than the threshold. As a result, since the long-time-exposure image is included in the group of images having sharpness equal to or higher than the threshold, the short-time-exposure images are deleted from the storage unit 300 and the long-time-exposure image is output.

On the other hand, in the processing of FIG. 2, in a case where the long-time-exposure image is not included in the group of images having sharpness equal to or higher than the threshold (S208: NO), the processing proceeds to S210. In S210, the compositing unit 180 composites the group of images having sharpness equal to or higher than the threshold (that is, a part of the short-time-exposure images set) into one image, and the group of images having sharpness lower than the threshold are deleted from the storage unit 300. Then, in S211, the output unit 190 outputs the image generated by the compositing in S210 (hereinafter referred to as "composite image"), and the processing of the present flowchart ends.

As is clear from FIG. 5, there is a tendency that the image capturing control unit 130 sets a higher ISO sensitivity for a shorter first exposure time (that is, faster shutter speed). In a case where the image capturing unit 200 captures an image according to a high ISO sensitivity, there is a possibility that noise increases in the captured image due to high sensitivity. Therefore, in a case where it is estimated that a subject blur occurs in a long-time-exposure image, the image processing apparatus 100 of the present embodiment performs the so-called multi frame noise reduction process for a set of images among the short-time-exposure images, ranked at a position equal to or above the threshold.

Figure 7:
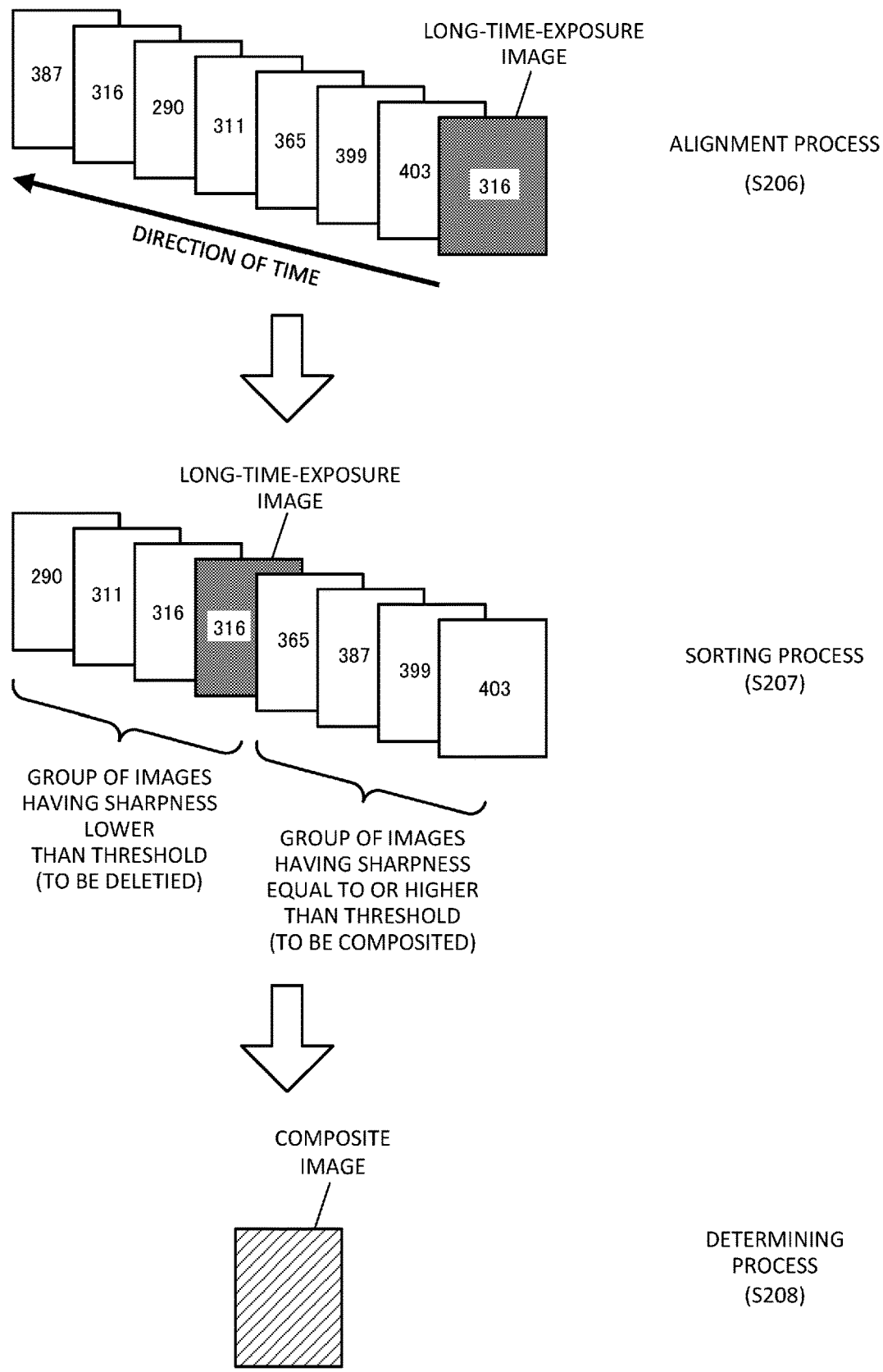
FIG. 7 is a diagram illustrating a specific example of outputting a composite image.

FIG. 7 is a diagram illustrating a specific example in which a composite image is output in the present embodiment. In FIG. 7, a situation in which alignment (S206) is performed for one long-time-exposure image and seven short-time-exposure images is illustrated. Each of the rectangles represents an image, and the number in each rectangle means the sharpness of the image.

In the specific example of FIG. 7, in a case where sorting in the order based on sharpness is performed on the group of images, the long-time-exposure image is ranked at the fifth of the eight total images. For example, in a case where the threshold for sharpness is "350", the four images having sharpness of "403", "399", "387", and "365", respectively, are included in the group of images having sharpness equal to or higher than the threshold, and the four images having sharpness of "316", "316", "311", and "290", respectively, are included in the group of images having sharpness lower than the threshold. As a result, since the long-time-exposure image is not included in the group of images having sharpness equal to or higher than the threshold, the four short-time-exposure images having sharpness of "403", "399", "387", and "365", respectively, are composited into one image, and the group of images having sharpness lower than the threshold (including the long-time-exposure image) are deleted from the storage unit 300, and the composite image is output.

Note that a condition pertaining to sharpness of a long-time-exposure image, in which the sharpness is equal to or higher than a threshold or the sharpness is higher than a threshold as described above, is an example of the condition with respect to a long-time-exposure image. Furthermore, compositing a group of short-time-exposure images having sharpness equal to or higher than a threshold (or higher than a threshold) as described above is an example of compositing short-time-exposure images selected from among multiple short-time-exposure images.

Practical Example

Next, an explanation is given of practical examples of an image capturing device, an electronic device (electronic apparatus), and an information processing device to which the above-described image processing apparatus 100 is applied or which include the above-described image processing apparatus 100. Here, as an example, an explanation is given of a practical example of a smartphone, which is a type of mobile phone having a camera function (having an image-capturing function). Note that, though needless to say, the practical examples to which the present invention can be applied are not limited to this practical example.

Figure 8:
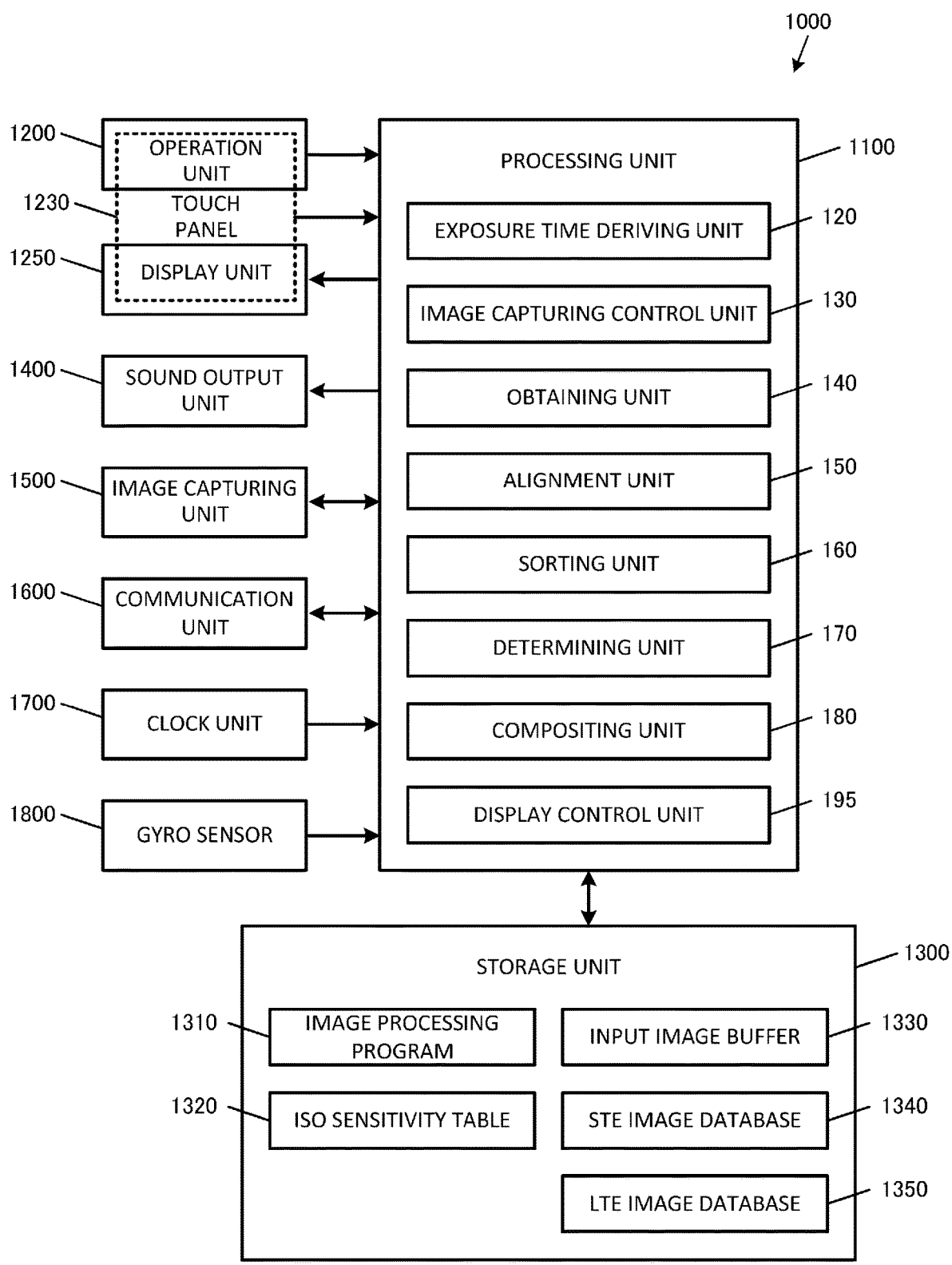
FIG. 8 is a block diagram illustrating an example of the functional configuration of a smartphone.

FIG. 8 is a diagram illustrating an example of the functional configuration of the smartphone 1000 according to the present practical example. For example, the smartphone 1000 includes a processing unit 1100, an operation unit 1200, a touch panel 1230, a display unit 1250, a storage unit 1300, a sound output unit 1400, an image capturing unit 1500, a communication unit 1600, a clock unit 1700, and a gyro sensor 1800.

The processing unit 1100 is a processing device that comprehensively controls each unit of the smartphone 1000 according to various programs such as a system program stored in the storage unit 1300 and performs various processes related to image processing. Furthermore, the processing unit 1100 is configured by including a processor such as a CPU or a DSP, an integrated circuit such as an ASIC, or the like.

The processing unit 1100 includes, as the main functional units thereof, the exposure time deriving unit 120, the image capturing control unit 130, the obtaining unit 140, the alignment unit 150, the sorting unit 160, the determining unit 170, the compositing unit 180, and a display control unit 195. These functional units respectively correspond to the functional units included in the image processing apparatus 100 of FIG. 1.

Note that the display control unit 195 controls the display unit 1250 to display (display output) various images, as one aspect of the output by the output unit 190 included in the image processing apparatus 100 of FIG. 1.

The operation unit 1200 is configured by including an input device to which a user can input various operations with respect to the smartphone 1000, such as an operation button, an operation switch and the like. In addition, the operation unit 1200 includes the touch panel 1230 which is configured integrally with the display unit 1250. Furthermore, the touch panel 1230 functions as an input interface between a user and the smartphone 1000. From the operation unit 1200, an operation signal according to a user operation is output to the processing unit 1100.

The display unit 1250 is a display device configured by including an LCD (Liquid Crystal Display), etc., and the display unit 1250 performs various display operations based on display signals output from the display control unit 195. In the present practical example, the display unit 1250 is configured integrally with the touch panel 1230 so as to form a touch screen.

The sound output unit 1400 is a sound output device configured by including a speaker, or the like, and the sound output unit 1400 outputs various types of sound based on sound output signals output from the processing unit 1100.

The image capturing unit 1500 is an image capturing device configured to be able to capture an image of a given scene, and the image capturing unit 1500 is configured by including an image capturing element (semiconductor element) such as a CCD (Charge Coupled Device) image sensor, a CMOS (Complementary MOS) image sensor or the like. In the image capturing unit 1500, light emitted from an object to be captured is transmitted through a lens (not illustrated in the drawings) to be imaged on a light-receiving plane surface of the image capturing element, and light-dark of the image light is converted into electric signals by photoelectric conversion. The electric signals obtained by the conversion are converted into digital signals by an A/D (analog-digital) converter (not illustrated in the drawings), and output to the processing unit 1100.

The communication unit 1600 is a communication device for transmitting and receiving information which has been used or is to be used inside the smartphone 1000, to and from an external information processing device. There are a variety of methods that can be applied to the communication method of the communication unit 1600, such as a form of wired connection via a cable in compliance with a predetermined communication standard, a form of connection via an intermediate device that can be also used as a charger and may be referred to as a cradle, a form of wireless connection by use of a near field communication, and the like.

The clock unit 1700 is an internal clock of the smartphone 1000 and, for example, is configured by including a crystal oscillator, a crystal oscillation unit which is an oscillation circuit, and the like. Clock information of the clock unit 1700 is output to the processing unit 1100 as needed.

The gyro sensor 1800 is a sensor that detects, for example, angular velocities around the three axes. Detection results of the gyro sensor 1800 are output to the processing unit 1100 as needed.

The storage unit 1300 is a storage device configured by including a hard disk device, a volatile or non-volatile memory such as a ROM, an EEPROM, a flash memory, or a RAM, and the like.

In the present practical example, for example, the storage unit 1300 stores an image processing program 1310, an ISO sensitivity table 1320, an input image buffer 1330, an STE (Short Time Exposure) image database 1340, and an LTE (Long Time Evolution) image database 1350.

The image processing program 1310 is a program to be read out by the processing unit 1100 and executed as image processing. For example, this image processing is executed as the processing based on the flowchart illustrated in FIG. 2.

In the ISO sensitivity table 1320, for example, a correspondence relationship between an exposure time and an ISO sensitivity such as the one illustrated in FIG. 5 is defined in a table form.

The input image buffer 1330 is a buffer in which, for example, a captured image captured through the image capturing unit 1500 is stored as an input image.

The STE image database 1340 is a database in which, for example, a short-time-exposure image captured with the first exposure time is stored. The LTE image database 1350 is a database in which, for example, a long-time-exposure image captured with the second exposure time is stored.

The processing unit 1100 of the smartphone 1000 performs image processing according to the image processing program 1310 stored in the storage unit 1300. This image processing is executed in accordance with the flowchart illustrated in FIG. 2.

In this case, in the processing of FIG. 2, the display control unit 195 controls the display unit 1250 so as to display the input image (captured image) received through the input unit 110 in S201 on the display unit 1250 as a live view image. Furthermore, the display control unit 195 controls the display unit 1250 that is configured as a touch screen, so as to display a shutter button for which a touch-operation can be performed via the touch panel 1230 on the display unit 1250. Then, in S204, the determining unit 170 determines whether or not a touch-operation (for example, a long-press operation on the shutter button) has been performed on the shutter button displayed on the display unit 1250 via the touch panel 1230.

Furthermore, in a case where the determination of S208 results in a positive determination (S208: YES), the display control unit 195 controls the display unit 1250 so as to display the long-time-exposure image (S209). Contrarily, in a case where the determination of S208 results in a negative determination (S208: NO), the display control unit 195 controls the display unit 1250 so as to display the composite image generated in S210 (S211).

Advantageous Effects of Embodiment

In the image processing apparatus 100 of the present embodiment, the alignment unit 150 performs alignment for a group of images that are continuous in a time series order, which include a plurality of short-time-exposure images that are captured with the first exposure time and a long-time-exposure image that is captured with the second exposure time that is longer than the first exposure time. Furthermore, in a case where the long-time-exposure image satisfies a certain condition (for example, a condition regarding sharpness), the output unit 190 outputs the long-time-exposure image, and, in a case where the long-time-exposure image does not satisfy the condition, the output unit 190 outputs a composite image that is generated by compositing images selected from among the plurality of short-time-exposure images. Accordingly, a subject blur is suppressed, and an image having a small amount of noise is generated. As a result, a high-quality image can be output.

Moreover, in this case, if the long-time-exposure image does not satisfy the condition, the output unit 190 outputs a composite image that is generated by compositing part of the short-time-exposure images set which satisfy the condition. Therefore, it is possible to appropriately select short-time-exposure images to be composited, and thereby to output a high-quality image.

Moreover, in the image processing apparatus 100, based on a predetermined criterion, the sorting unit 160 sorts a group of images for which alignment has been performed by the alignment unit 150. Therefore, the determination by the determining unit 170 as for the condition regarding the long-time-exposure image, which follows the alignment process, can be easily made.

Moreover, in this case, the sorting unit 160 sorts a group of images for which alignment has been performed, based on sharpness. Therefore, sorting of the group of images is easily and appropriately performed.

Moreover, in this case, the sorting unit 160 ranks a sorting target image at a higher position according to an increase in the size of a superimposed region which is common with other image(s) of the group of images for which alignment has been performed by the alignment unit 150, and thereby it is possible to realize sorting in consideration of the size of a superimposed region. As a result, images suitable for compositing by the compositing unit 180 can be ranked at a higher position.

Moreover, in the image processing apparatus 100, the compositing unit 180 generates a composite image based on a group of images sorted by the sorting unit 160. Furthermore, in a case where the sharpness of a long-time-exposure image does not satisfy a predetermined degree of sharpness, the compositing unit 180 composites a plurality of short-time-exposure images having sharpness that satisfy the predetermined degree of sharpness. Accordingly, it possible to generate a composite image based on short-time-exposure images having appropriate sharpness, and thereby a high-quality image can be generated.

Moreover, in the image processing apparatus 100, the exposure time deriving unit 120 derives an exposure time corresponding to a motion vector amount of a subject included in captured images captured through the image capturing unit 200. Furthermore, the image capturing control unit 130 controls the image capturing unit 200. Concretely, the image capturing control unit 130 controls the exposure time of the image capturing unit 200, based on the exposure time derived by the exposure time deriving unit 120, and thereby it is possible to allow the image capturing unit 200 to capture an image based on an appropriate exposure time.

Moreover, in this case, by setting the exposure time of the image capturing unit 200 to the first exposure time, it is possible to allow the image capturing unit 200 to capture a plurality of short-time-exposure images based on an appropriate exposure time.

Moreover, in this case, the exposure time "t" derived by the exposure time deriving unit 120 is expressed by "t=d×x/m" where the motion vector amount of the subject included in the captured images is "m", the predetermined set value is "x", and the time interval for capturing the captured images is "d". Then, by using the number of pixels as a set value indicating the spatial distance between corresponding pixels in at least two captured images, it is possible to derive an exposure time by a simple calculation using the appropriate set value.

Moreover, by setting the above-described condition with respect to a condition regarding the sharpness of a long-time-exposure image, it is possible to easily and appropriately determine whether to output the long-time-exposure image or a composite image, based on the sharpness of the long-time-exposure image.

Other Embodiment

Embodiments to which the present invention can be applied are not limited to the embodiment described above. Hereinafter, an explanation is given of modification examples.

<Index Value>

In the above-described embodiment, sharpness is used as an index value for an image. However, use of sharpness is merely an example, and another index value may be used. The index value may be any value other than sharpness as long as the value is calculated from a pixel value of each of the obtained images and can be used for evaluating an image quality. For example, lightness (brightness), noise amount, contrast, white balance, and the like, can be applied as an index value other than sharpness. The same processing as in the above-described embodiment may be performed by use of such an index value other than sharpness.

<Condition>

Although a condition pertaining to sharpness is set as the condition with respect to a long-time-exposure image in the above-described embodiment, the condition is not limited as such. Specifically, for example, a condition pertaining to one of the above-described index values other than sharpness may be set as the condition with respect to a long-time-exposure image.

Additionally, for example, a statistic such as an average value or a median value of sharpness of the short-time-exposure images set may be calculated. Then, the sharpness of the long-time-exposure image being equal to or higher than the calculated statistic (or higher than the calculated statistic) may be set as the condition with respect to a long-time-exposure image.

<Composite Image>

In the above-described embodiment, in a case where sharpness of a long-time-exposure image is lower than a threshold, a composite image which is generated by compositing short-time-exposure images having sharpness equal to or higher than the threshold into one image, is output. However, the above-described embodiment is not limited as such.

Specifically, for example, in a case where the sharpness of the long-time-exposure image is lower than the threshold, short-time-exposure images having sharpness higher than the sharpness of the long-time-exposure image may be selected from among the short-time-exposure images set. Then, a composite image may be generated by compositing the selected short-time-exposure images into one image and output.

Moreover, for example, in a case where the sharpness of the long-time-exposure image is lower than the threshold, a statistic such as an average value or a median value of sharpness of the short-time-exposure images set may be calculated, for selecting short-time-exposure images having sharpness higher than the statistic. Then, a composite image may be generated by compositing the selected short-time-exposure images into one image and output.

Moreover, for example, in a case where the sharpness of the long-time-exposure image is lower than the threshold, it is possible to select a predetermined number of short-time-exposure images from among the short-time-exposure images set in descending order from the short-time-exposure image having the highest sharpness. Or, it is possible to select a predetermined number of short-time-exposure images from among the short-time-exposure images having sharpness equal to or higher than the threshold in descending order from the short-time-exposure image having the highest sharpness. Then, a composite image may be generated by compositing the selected short-time-exposure images into one image and output.

Moreover, for example, in a case where the sharpness of the long-time-exposure image is equal to or higher than the threshold (or higher than the threshold), a composite image may be generated by compositing short-time-exposure image(s) having sharpness equal to or higher than the threshold (or higher than the threshold) and the long-time-exposure image into one image and output.

<Configuration of Image Processing Apparatus>

As for the constituent elements of the above-described image processing apparatus 100, it is not necessary to include all such elements in the image processing apparatus 100.

Specifically, for example, the obtaining unit 140 may be excluded from the elements of the image processing apparatus 100 illustrated in FIG. 1, and the alignment unit 150 may select, from among captured images that have been input through the input unit 110, a group of images including a short-time-exposure images set that have been captured with the first exposure time and a long-time-exposure image that has been captured with the second exposure time that is longer than the first exposure time, and alignment may be performed on the selected group of images. Furthermore, for example, the alignment unit 150 may be excluded.

Moreover, for example, the image capturing control unit 130 may be excluded from the elements of the image processing apparatus 100, and the image capturing control unit 130 may be provided in the image capturing unit 200.

<Image Capturing Device, etc.>

Moreover, in the above-described practical example, the case that the present invention is applied to a smartphone, which is an example of an image capturing device, an electronic device (electronic apparatus) and an information processing device, is explained. However, the above-described practical example is not limited as such. In addition to a mobile phone such as a smartphone, the present invention can be applied to various devices such as a camera, a PDA, a personal computer, a navigation device, a wristwatch, and various types of tablet terminals.

Moreover, although it is preferable that the above-described various types of devices include an image capturing unit (image capturing means), it is not necessary to include such an image capturing unit. In this case, for example, data of a captured image may be input from an external device including an image capturing unit, and the image processing may be performed based on the input data of the captured image.

<Recording Medium>

Moreover, in the above-described embodiment, various programs and data related to the image processing are stored in the storage unit 300, and the processing unit reads out and executes the programs, so as to realize the above-described image processing in each embodiment. In this case, in addition to internal storage devices such as a ROM, an EEPROM, a flash memory, a hard disk, a RAM, and the like, the storage unit of each device may include a recording medium (recording media, external storage device, storage medium) such as a memory card (SD card), a compact flash (registered trademark) card, a memory stick, a USB memory, a CD-RW (optical disk), an MO (magneto-optical disk), and the like. Further, the various programs and data as described above may be stored in such a recording medium.

Figure 9:
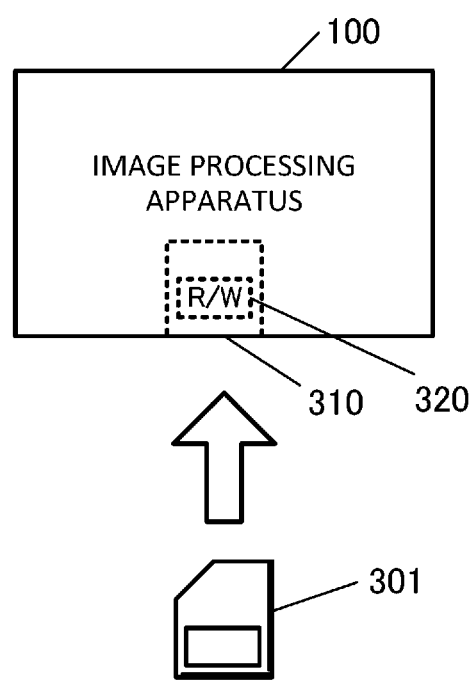
FIG. 9 is a diagram illustrating an example of a recording medium.

FIG. 9 is a diagram illustrating an example of a recording medium in this case. The image processing apparatus 100 is provided with the card slot 310 for inserting the memory card 301 and the card reader-writer (R/W) 320 for reading information stored in the memory card 301 inserted to the card slot 310 or for writing information to the memory card. The card R/W 320 is controlled by the processing unit to perform an operation of writing a program or data recorded in the storage unit 300 to the memory card 301. It is configured that the programs and data recorded in the memory card 301 are read out by an external device other than the image processing apparatus 100, so as to realize the image processing in the above-described embodiment in the external device.

What is claimed is:

1. An image processing apparatus comprising:
a processor configured to function as:
an alignment unit configured to perform alignment for a group of images including a plurality of short-time-exposure images that are captured with a first exposure time and a long-time-exposure image that is captured with a second exposure time that is longer than the first exposure time; and
an output unit configured to output the long-time-exposure image in a case where the long-time-exposure image satisfies a predetermined condition and configured to output a composite image which is generated by compositing a plurality of images selected from among the plurality of short-time-exposure images, in a case where the long-time-exposure image does not satisfy the predetermined condition, wherein the predetermined condition includes a condition pertaining to sharpness of the long-time-exposure image.

2. The image processing apparatus according to claim 1, wherein, in the case where the long-time-exposure image does not satisfy the predetermined condition, the output unit outputs a composite image generated by compositing a plurality of images that satisfy the predetermined condition, among the plurality of short-time-exposure images.

3. The image processing apparatus according to claim 1 wherein the processor is further configured to function as:
a sorting unit configured to sort the group of images for which the alignment has been performed, based on a predetermined criterion.

4. The image processing apparatus according to claim 3, wherein the predetermined criterion includes a criterion pertaining to sharpness.

5. The image processing apparatus according to claim 4, wherein the sorting unit ranks a sorting target image among the group of images, at a higher position according to an increase in a size of a superimposed region of the sorting target image, the superimposed region being a region common to another image of the group of images for which the alignment has been performed.

6. The image processing apparatus according to claim 4 wherein the processor is further configured to function as:
a compositing unit configured to generate the composite image, based on the group of images sorted by the sorting unit,
wherein, in a case where sharpness of the long-time-exposure image does not satisfy a predetermined degree of sharpness, the compositing unit composites a plurality of images from among the plurality of short-time-exposure images, having sharpness that satisfies the predetermined degree of sharpness.

7. The image processing apparatus according to claim 1 wherein the processor is further configured to function as:
a deriving unit configured to derive an exposure time corresponding to a motion vector amount of a subject included in images that are captured through an image capturing unit; and
an image capturing control unit configured to control the image capturing unit, wherein the image capturing control unit sets an exposure time for the image capturing unit, based on the exposure time derived by the deriving unit.

8. The image processing apparatus according to claim 7, wherein the set exposure time for the image capturing unit is the first exposure time.

9. The image processing apparatus according to claim 7, wherein the exposure time "t" derived by the deriving unit is expressed by "t=d×x/m" where the motion vector amount of the subject included in the captured images is "m", a predetermined set value is "x", and a time interval for capturing the captured images is "d", and
wherein the set value is the number of pixels being a spatial distance between a corresponding pixel in at least two among the captured images.

10. The image processing apparatus according to claim 1 further comprising:
an image capturing unit, comprising an image sensor, wherein the plurality of short-time-exposure images are captured by the image capturing unit with the first exposure time, and the long-time-exposure image is captured by the image capturing unit with the second exposure time.

11. An image processing method comprising:
performing alignment for a group of images including a plurality of short-time-exposure images that are captured with a first exposure time and a long-time-exposure image that is captured with a second exposure time that is longer than the first exposure time; and
outputting the long-time-exposure image in a case where the long-time-exposure image satisfies a predeteii lined condition and outputting a composite image which is generated by compositing a plurality of images selected from among the plurality of short-time-exposure images, in a case where the long-time-exposure image does not satisfy the predetermined condition,
wherein the predetermined condition includes a condition pertaining to sharpness of the long-time-exposure image.

12. A non-transitory recording medium which can be read by a computer and stores a program for causing the computer to:
perform alignment for a group of images including a plurality of short-time-exposure images that are captured with a first exposure time and a long-time-exposure image that is captured with a second exposure time that is longer than the first exposure time; and
output the long-time-exposure image in a case where the long-time-exposure image satisfies a predetermined condition and output a composite image which is generated by compositing a plurality of images selected from among the plurality of short-time-exposure images, in a case where the long-time-exposure image does not satisfy the predetermined condition,
wherein the predetermined condition includes a condition pertaining to sharpness of the long-time-exposure image.

* * * * *